April 30, 1957  D. F. WILLCOX  2,790,860
MOTOR DRIVEN TAP SWITCH
Filed April 6, 1955  2 Sheets-Sheet 1
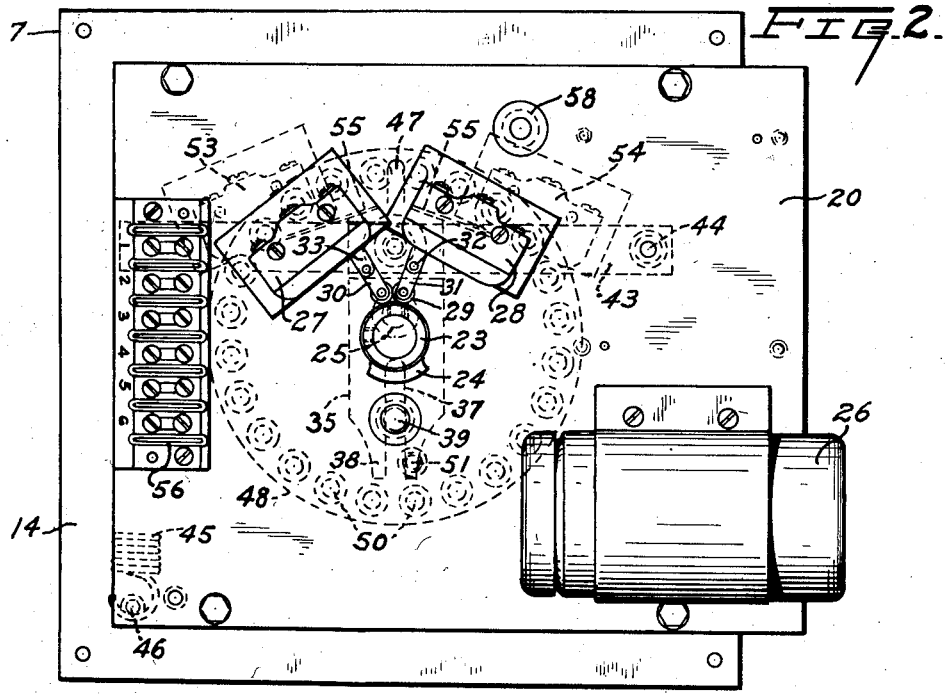
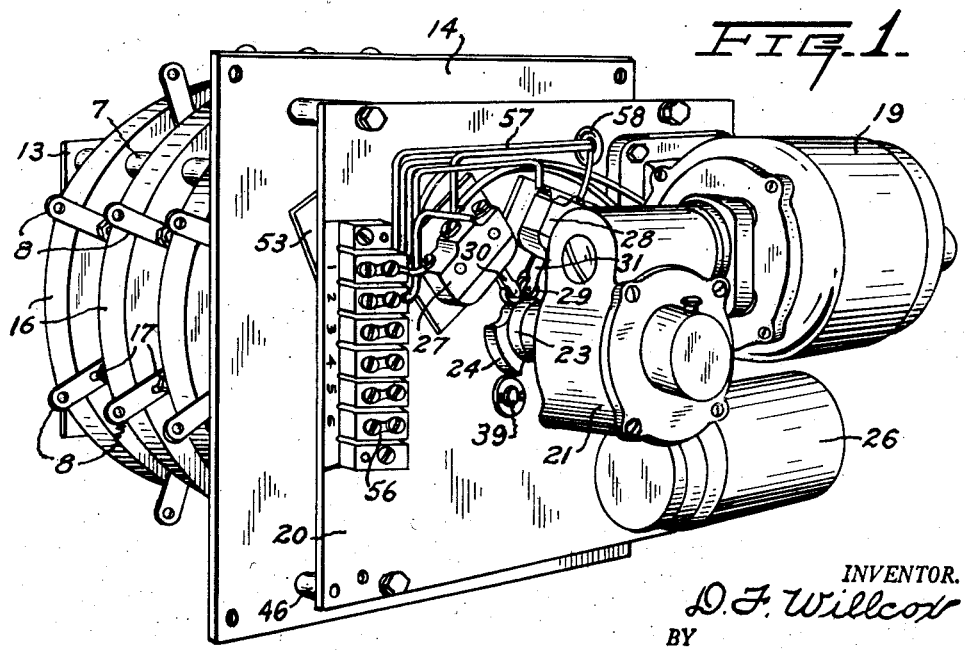
INVENTOR.
D. F. Willcox
BY
Lieber & Lieber
ATTORNEYS.

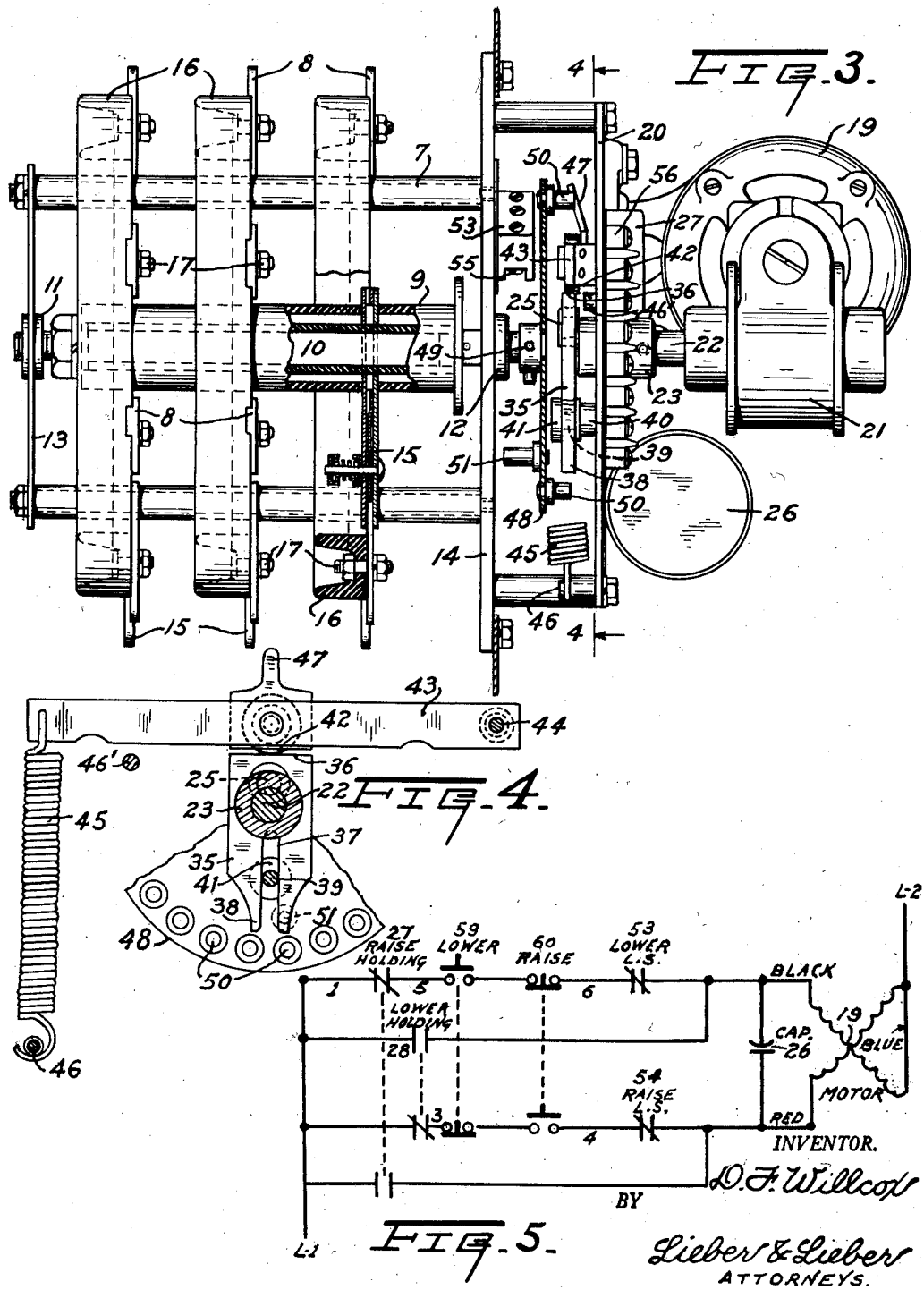

United States Patent Office 2,790,860
Patented Apr. 30, 1957

2,790,860

MOTOR DRIVEN TAP SWITCH

Dale F. Willcox, Villa Park, Ill., assignor to Furnas Electric Company, Batavia, Ill., a corporation of Illinois Application April 6, 1955, Serial No. 499,573

6 Claims. (Cl. 200—6)

The present invention relates in general to improvements in electrical control apparatus, and relates more specifically to improvements in the construction and operation of mechanism for controlling the actuation of tap switches, or the like.

The primary object of the present invention is to provide an improved motor driven tap switch assemblage which is simple and durable in construction, and which is also reliable and highly efficient in operation.

Some of the more important specific objects of the invention are as follows:

To provide an improved electric motor drive for controlling rapid and accurate functioning of a multiple position tap switch or the like, in order to maintain desired voltage conditions in systems such as employed in electro-plating.

To provide an improved remote control for changing the tap setting of a rotary tap switch with utmost precision and dependability in order to raise or lower the voltage in electrical systems.

To provide an automatic system for regulating the functioning of a tap switch assemblage, from a remote station, with the aid of a simple but reliable push-button control switch, or the like.

To provide an improved manual control for the actuating motor of a tap switch, which insures extreme flexibility in the use and functioning of such switches.

To provide an improved multiple tap switch control system embodying a reversible single phase electric motor, and which is especially useful for regulating the operation of plating equipment or the like.

To provide improved mechanism for effectively transmitting motion from a reversible motor to a rotary tap switch or the like.

To provide an improved motor drive for automatically correctly positioning the contacts of a rotary tap switch, and which also quickly compensates for any voltage variations in the switch actuating system.

To provide an improved electric motor drive and control system especially applicable to tap switches of the type shown in U. S. Patent No. 2,487,967, granted November 15, 1949.

These and other more specific objects and advantages of the invention will be apparent from the following detailed description.

A clear conception of the features constituting the present improvement, and of the construction and operation of a typical commercial motor driven tap switch unit embodying the invention, may be had by referring to the drawings accompanying and forming a part of this specification wherein like reference characters designate the same or similar parts in the various views.

Fig. 1 is a front and side perspective view of one of the improved rotary tap switch units, looking toward the electric driving motor and one side of the switch;

Fig. 2 is a full front view of the tap switch shown in Fig. 1, but with the driving motor and speed reducer omitted in order to show the micro-switches and other normally hidden details of the unit;

Fig. 3 is a part sectional side elevation of the completely assembled unit mounted upon a support;

Fig. 4 is a part sectional view looking down upon the intermittent advancing mechanism for the revolving tap switch contacts, the section having been taken along the line 4—4 of Fig. 3; and Fig. 5 is a simple electric circuit diagram of the motor and control switches of the improved system, but it does not include the tap switch circuit.

While the invention has been shown and described herein as being especially advantageously applicable to a multiple contact rotary tap switch particularly adaptable to plating systems, it is not intended to unnecessarily limit its application to such systems; and it is also contemplated that specific descriptive terms employed herein be given the broadest possible interpretation consistent with the disclosure.

Referring to the drawings, the rotary tap switch is of the general type shown in U. S. Patent No. 2,487,967 and comprises, a main frame 7 having three coaxial annular series of axially separated but alined fixed contacts 8 mounted thereon; and a rotor 9 having a polygonal shaft 10 journalled for rotation in bearings 11, 12 carried by the opposite end plates 13, 14 respectively of the frame 7, and which has three radial relatively staggered movable contacts 15 mounted thereon, see Figs. 1 and 3. These movable contacts 15 are revolvable step by step about the rotor axis and are so formed and located with respect to each other that two of the movable contacts 15 will always remain in engagement with the corresponding fixed contacts 8 of their adjacent series whenever the third contact 15 is being advanced into engagement with a new fixed contact 8 of its series. The fixed contacts 8 are so spaced and mounted upon the frame 7, that only one of these contacts at a time is re-engaged during each step advancement of the rotor 9, and the fixed contacts 8 are secured to insulating rings 16 constituting part of the frame 7, by bolts 17 and are provided with terminal attaching screws applied to threaded openings at their outer ends, to which the current conducting wires of an electro-plating installation or the like may be connected in a well known manner.

An electric motor 19 which is preferably of the single phase three wire reversible capacitor type is mounted upon the outer face of a support 20 secured to the end plate 14 of the frame 7, and has its main shaft drivingly connected through a speed reducer 21 with a slow speed rotary shaft 22 which is disposed in axial alinement with the rotor shaft 10 of the tap switch, see Figs. 1, 2 and 3. Mounted upon the exposed end of the shaft 22 is a cam collar 23 which is rotatable in the support 20 and has a cam 24 projecting therefrom beyond the outer face of the support 20 and is provided with an eccentric pin 25 beyond the inner face of this support. Also mounted upon the outer face of the motor support 20 is a capacitor 26 which is essentially a part of the motor unit, and likewise mounted is a pair of micro-switches 27, 28 adapted to be actuated by the cam 24 of the collar 23 through rollers 29 carried by arms 30, 31 respectively swingably supported on pivots 32 mounted upon the actuating levers 33 of these switches. The micro-switches 27, 28 are holding switches of well known construction operable when actuated in one direction only so that they will complete or hold-in only a single circuit, and they are alternately operable upon rotation of the cam collar 23 in opposite directions.

Located adjacent to the inner face of the motor support 20 is a bifurcated indexing plate or lever 35 one end of which is provided with a plane surface 36 and with an opening coacting with the eccentric pin 25 of the cam collar 23, while its opposite end portion has therein an elongated slot 37 forming end fingers 38. The slot 37 is slidably engageable with a fixed pivot pin 39 secured to the support 20 and projecting inwardly therefrom, and this pin 39 is embraced by a lever spacer 40 and has an enlarged head 41 at its end remote from the support 20 for retaining the lever 35 in place. When the cam collar 23 is revolving, the lever 35 is moved up and down and is also swung laterally by the revolving eccentric pin 25, thereby causing the fork fingers 38 to simultaneously reciprocate and oscillate. The upper plane surface 36 of the lever 35 is engaged by a roller 42 journalled on the mid-portion of a brake lever 43 one end of which is fulcrumed on a pin 44 secured to the motor support 20, while its opposite swinging end is attached to one end of a coil spring 45 the other end of which is connected by pin 46 to the support 20. This spring 45 urges the roller 42 against the lever surface 36 and toward a stop post 46′, and the mid-portion of the lever 43 is also provided with a finger projection 47 formed on the roller supporting bracket, see Figs. 3 and 4.

An indexing disk or wheel 48 which is firmly but adjustably and coaxially secured to the end of tap switch rotor shaft 10 nearest to the frame end plate 14 by means of a clamp 49, has an annular series of equally spaced pin members 50 secured thereto and projecting from one side thereof, and also has a single pin 51 projecting from its opposite side, as shown in Figs. 2 and 3. When the motor 19 is operating and the indexing lever 35 is moved downwardly by the revolving eccentric pin 25, the depending fingers 38 of the lever 35 will swing laterally depending upon the direction of rotation of the collar 23, and will engage one of the index pin members 50, and during such downward movement of the lever 35 the spring 45 will coact with the brake lever 43 to withdraw the projection 47 from the path of revolution of the pin members 50 until the lever 43 engages the stop post 46′. As the indexing lever 35 is subsequently raised by continued revolution of the eccentric pin 25, the fingers 38 will swing laterally in the opposite direction and will thereby rotate the wheel 48 one step, after which these fingers will again be raised free of the previously engaged index pin member 50 and the finger 47 will be simultaneously raised and inserted between two of the pin members 50 at the opposite side of the wheel 48 so as to arrest the rotation of the latter.

Mounted upon the end plate 14 of the main frame 7, are two limit micro-switches 53, 54 each having an actuating arm 55 alternately cooperable with the oppositely revolving single pin 51 projecting from the side of the indexing wheel nearest to the frame end plate 14, in order to limit the rotation of the wheel 48 in opposite directions, see Figs. 2 and 3. A terminal strip 56 for facilitating proper installation of the electrical conductors 57 of the unit is also secured to the edge of the support 20 remote from the motor 19, and the conductors 57 for the switches 53, 54 may be passed through an insulating bushing 58 also carried by the support 20. In order to complete the installation, two manually operable double throw switches 59, 60 which may be of the pushbutton type, and may also be located at any conveniently accessible control station remote from the tap switch unit, must also be provided, as shown in Fig. 5. These pushbutton switches 59, 60 may be marked "raise" and "lower" to clearly indicate their usage, and the tap switch control system may be connected to the main electric power lines L–1 and L–2 as depicted in the simple wiring diagram of Fig. 5.

When the various parts of the tap switch and of its control system have been properly constructed, initially adjusted and installed as above described, its operation is as follows with special reference to the diagram of Fig. 5. If either the "lower" or the "raise" pushbutton 59, 60 is depressed, an electric circuit will be established from the main lines L–1 and L–2 to the motor 19 thereby causing it to rotate and to revolve the shaft 22 and cam collar 23. Assuming the "lower" pushbutton 59 to be depressed, an electric circuit will then be completed from line L–1 through conductor 1, "raise" holding micro-switch 27, conductors 5, normally closed "raise" pushbutton switch 60, conductors 6, and "lower" limit switch 53, to the Black motor lead. Since the motor 19 is a single phase three wire reversible capacitor type, application of voltages to the Black lead will cause this motor to rotate in a direction which lowers the position or tap setting of the main rotary switch. Shortly after the motor 19 has rotated sufficiently to begin to revolve the rotor 9 of the tap switch, the cam 24 of the rotating collar 23 will close the "lower" holding micro-switch 28 and will thus hold the circuit around the pushbuttons 59, 60, but if the pushbutton 59 is released at a transfer or midpoint of the tap changing cycle, this cycle will still be completed before holding is effected.

Similar functioning is effected when the "raise" pushbutton 60 is depressed, except that a circuit will then be completed from line L–1 through conductors 3 and 4, and the "raise" limit switch 54 to the Red motor lead, thus causing the motor 19 to rotate in the opposite direction. The "raise" holding micro-switch 27 will then hold the circuit to the Red motor lead while the cycle is being completed, and upon completion of any cycle, the projection 47 on the lever 43 will positively hold the tap switch rotor 9 against possible movement while the "raise" and "lower" limit micro-switches will also break the pushbutton switch circuit whenever the main tap switch reaches its extreme limits of travel in either direction. In the event that both the "raise" and the "lower" pushbutton switches 59, 60 are simultaneously depressed, their normally closed movable contacts will open both circuits to the Red and Black motor leads and no harm will be done as the motor 19 will not operate under such conditions, but release of either of the switch buttons while the other remains depressed will cause the motor 19 to rotate in the direction corresponding to the depressed switch button. If the main tap switch is in mid-transfer position, for instance, proceeding in "raise" direction, and with the "raise" holding switch 27 operative to hold the circuit to the Red motor lead, then no circuit can be established to the Black motor lead since the circuit between conductors 1 and 5 will be open, thus permitting the cycle to be completed in case the "lower" pushbutton switch 59 is depressed; and similar operation results if the tap switch is proceeding in "lower" direction.

From the foregoing detailed description it should be apparent that the improved system is highly flexible and dependable in operation to either raise or lower the voltage in the plating or other equipment controlled by the main rotary tap switch. The manually operated switches 59, 60 may obviously be of the pushbutton or any other suitable manual or automatically functioning type capable of functioning as described, and may be located at any convenient station either in proximity to or remote from the tap switch unit. When these control switches 59, 60 are of the automatically functioning type the entire system may be caused to operate without manual attention since operation of the tap switch actuating mechanism is entirely automatic and functions with utmost precision and safety. The holding micro-switches 27, 28 insure completion of each cycle of operations, while the limit micro-switches 53, 54 prevent over-travel of the movable tap switch contacts, and the improved system has proven highly satisfactory and successful in actual commercial use especially as applied to electroplating equipment.

It should be understood that it is not desired to limit this invention to the exact details of construction and operation of the tap switch control mechanism and system herein specifically shown and described, for various modifications within the scope of the appended claims may occur to persons skilled in the art.

I claim:
1. A rotary tap switch drive comprising, a motor, a shaft rotatable by said motor and having thereon a revolvable eccentric pin, a lever pivotally suspended from said pin on one side of the shaft axis and having an elongated slot therein on the opposite side of said axis coacting with a fixed pivot and providing spaced fingers extending away from said eccentric pin and outwardly beyond said fixed pivot, said fingers being movable longitudinally and laterally swingable relative to said pivot upon revolution of said eccentric pin by said shaft, a rotary index wheel having an annular series of pin members with which the outermost free ends of said fingers are successively engageable to rotate the wheel step by step, and movable switch contacts revolvable by said wheel.

2. A rotary tap switch drive comprising, a reversible motor, a shaft rotatable in opposite directions by said motor and having thereon a cam and a revolvable eccentric pin, switches alternately operable by said cam to limit the reverse rotation of said motor, a lever pivotally suspended from said pin on one side of the shaft axis and having an elongated slot therein on the opposite side of said axis coacting with a fixed pivot and providing spaced fingers extending away from said eccentric pin and outwardly beyond said fixed pivot, said fingers being movable longitudinally and laterally swingable relative to said pivot upon revolution of said eccentric pin by said shaft, a rotary index wheel having an annular series of pin members with which the outermost free ends of said fingers are successively engageable to rotate the wheel step by step, and movable switch contacts revolvable by said wheel.

3. A rotary tap switch drive comprising, a motor, a shaft rotatable by said motor and having thereon a revolvable eccentric pin, a lever pivotally suspended from said pin on one side of the shaft axis and having a single elongated slot therein on the opposite side of said axis coacting with a fixed pivot and providing spaced fingers extending away from said eccentric pin and outwardly beyond said pivot, said fingers being movable longitudinally and laterally swingable relative to said pivot upon revolution of said eccentric pin by said shaft, a rotary index wheel having an annular series of pin members with which the outer free ends of said fingers are successively engageable to rotate the wheel step by step, a holding lever for said wheel having thereon a roller resiliently cooperable with said slotted lever and being provided with a finger projection holdingly cooperable directly with said pin members, and movable switch contacts revolvable by said wheel.

4. A rotary tap switch drive comprising, an electric motor, a shaft reversely rotatable by said motor and having thereon a revolvable cam and an eccentric pin, a pair of switches alternately operable by said cam to limit the reverse rotation of said shaft, a lever pivotally suspended from said pin on one side of the shaft axis and having an elongated slot on the opposite side of said axis coacting with a fixed pivot and providing spaced fingers extending away from said eccentric pin, said fingers being movable longitudinally and swingable laterally upon revolution of said eccentric pin by said shaft, a rotary index wheel having an annular series of pin members with which the outermost free ends of said fingers are successively engageable to rotate the wheel, and movable switch contacts revolvable by said wheel.

5. A rotary tap switch drive comprising, a motor, a shaft rotatable by said motor and having thereon a revolvable eccentric pin, a plate lever pivotally suspended from said pin on one side of the shaft axis and having spaced fingers extending away from said eccentric pin outwardly beyond the opposite side of said axis, said fingers being movable longitudinally and swingable laterally upon revolution of said eccentric by said shaft, a rotary index wheel having an annular series of spaced indexing pin members with which the outer free ends of said fingers are successively engageable to rotate the wheel, a holding lever for said wheel having one end fixedly pivoted and its opposite end urged toward the plate lever by a spring while its medial portion is resiliently cooperable with said plate lever, said holding lever being provided with a finger projection holdingly cooperable directly with said indexing members, and movable switch contacts revolvable by said wheel.

6. A rotary tap switch drive comprising, a rotary motor, an eccentric rotatable by said motor, a lever having one end coacting with said eccentric and provided with a flat end surface and having a single elongated slot at its opposite end coacting with a fixed pivot and providing spaced fingers, said fingers being movable longitudinally and swingable laterally upon revolution of said eccentric by said motor, a rotary wheel having an annular series of indexing pin members with which the ends of said fingers beyond said pivot are successively engageable to rotate the wheel step by step, a holding lever for said wheel having thereon a rotary roller resiliently cooperable with the flat end of said slotted lever adjacent to said eccentric and being provided with a finger projection holdingly cooperable with said pin members, a spring for constantly urging said holding lever and said finger projection away from said indexing pins, and movable tap switch contacts revolvable by said wheel.

References Cited in the file of this patent
UNITED STATES PATENTS

| | | |
|---|---|---|
| 1,386,897 | Rockwell et al. | Aug. 9, 1921 |
| 2,482,722 | Tarry | Sept. 20, 1949 |
| 2,565,649 | Chappell | Aug. 28, 1951 |